(12) United States Patent
Kutch et al.

(10) Patent No.: US 11,934,330 B2
(45) Date of Patent: Mar. 19, 2024

(54) MEMORY ALLOCATION FOR DISTRIBUTED PROCESSING DEVICES

(71) Applicant: Intel Corporation, Santa Clara, CA (US)

(72) Inventors: Patrick G. Kutch, Tigard, OR (US); Andrey Chilikin, Limerick (IE)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 15/931,476

(22) Filed: May 13, 2020

(65) Prior Publication Data

US 2021/0349820 A1  Nov. 11, 2021

Related U.S. Application Data

(60) Provisional application No. 63/022,193, filed on May 8, 2020.

(51) Int. Cl.
*G06F 3/06* (2006.01)
*G06F 9/50* (2006.01)
(Continued)

(52) U.S. Cl.
CPC ........ *G06F 13/4027* (2013.01); *G06F 3/0604* (2013.01); *G06F 3/061* (2013.01);
(Continued)

(58) Field of Classification Search
CPC ............. G06F 13/4027; G06F 13/4221; G06F 3/0604; G06F 3/061; G06F 3/0656;
(Continued)

(56) References Cited

U.S. PATENT DOCUMENTS 8,862,783 B2  10/2014  Yadlon et al.
9,641,435 B1   5/2017  Sivaramakrishnan
(Continued)

FOREIGN PATENT DOCUMENTS

KR   20140141348 A   12/2014
WO    2016003489 A1   1/2016

OTHER PUBLICATIONS

International Search Report and Written Opinion for PCT Patent Application No. PCT/US20/65076, dated Apr. 9, 2021, 9 pages.
(Continued)

*Primary Examiner* — Christopher B Shin
(74) *Attorney, Agent, or Firm* — Compass IP Law PC

(57) ABSTRACT

Examples described herein relate to an offload processor to receive data for transmission using a network interface or received in a packet by a network interface. In some examples, the offload processor can include a packet storage controller to determine whether to store data in a buffer of the offload processing device or a system memory after processing by the offload processing device. In some examples, determine whether to store data in a buffer of the offload processor or a system memory is based on one or more of: available buffer space, latency limit associated with the data, priority associated with the data, or available bandwidth through an interface between the buffer and the system memory. In some examples, the offload processor is to receive a descriptor and specify a storage location of data in the descriptor, wherein the storage location is within the buffer or the system memory.

20 Claims, 11 Drawing Sheets

(51) Int. Cl.
  *G06F 12/0802* (2016.01)
  *G06F 13/40* (2006.01)
  *G06F 13/42* (2006.01)
(52) U.S. Cl.
  CPC .......... *G06F 3/0656* (2013.01); *G06F 3/0679* (2013.01); *G06F 9/5083* (2013.01); *G06F 12/0802* (2013.01); *G06F 13/4221* (2013.01); *G06F 2212/6042* (2013.01); *G06F 2213/0026* (2013.01); *G06F 2213/40* (2013.01)
(58) Field of Classification Search
  CPC .. G06F 3/0679; G06F 9/5083; G06F 12/0802; G06F 2212/6042; G06F 2213/0026; G06F 2213/40
  USPC .......................................................... 711/118
  See application file for complete search history.

(56) References Cited

U.S. PATENT DOCUMENTS

| | | | |
|---|---|---|---|
| 10,225,183 | B2 | 3/2019 | Chayat et al. |
| 2013/0254766 | A1 | 9/2013 | Zuo et al. |
| 2013/0318275 | A1 | 11/2013 | Dalal |
| 2013/0340977 | A1 | 12/2013 | Singleton |
| 2013/0343408 | A1 | 12/2013 | Cook et al. |
| 2014/0201417 | A1 | 7/2014 | Dalal et al. |
| 2016/0092238 | A1 | 3/2016 | Codrescu et al. |
| 2017/0063808 | A1 | 3/2017 | Manapragada et al. |
| 2019/0124054 | A1 | 4/2019 | Zhang et al. |
| 2020/0192757 | A1* | 6/2020 | Qin .................... G06F 11/1076 |

OTHER PUBLICATIONS

International Search Report and Written Opinion for PCT Patent Application No. PCT/US20/67073, dated May 6, 2021, 13 pages.

"5G User Plane Function (UPF)—Performance with ASTRI", Intel Solution Brief, Jun. 8, 2020, 6 pages.
"5G; System architecture for the 5G System (5GS) (3GPP TS 23.501 version 15.5.0 Release 15)", ETSI, Technical Specification, (Apr. 2019) 242 pages.
"Intel Ethernet Adaptive Virtual Function (AVF) Hardware Architecture Specification (HAS)", Intel, Networking Division, Feb. 5, 2018, 90 pages.
"TCP Offload Engine (TOE)", Chelsio Communications, https://www.chelsio.com/nic/tcp-offload-engine/, downloaded from the internet Dec. 27, 2022, 1 page.
"What is a semiconductor package substrate?", Toppan Electronics, https://www.toppan.co.jp/electronics/english/package/semicon/, downloaded from the internet Dec. 27, 2022, 3 pages.
"What is the 5G User Plane Function (UPF)?", Metaswitch, https://www.metaswitch.com/knowledge-center/reference/what-is-the-5g, Aug. 16, 2020, 5 pages.
Benton, Brad, "CCIX, Gen-Z, OpenCAPI: Overview & Comparision", Openfabrics Alliance, AMD, 13th Annual Workshop 2017, Mar. 2017, 16 pages.
Go, Younghwan, et al., "APUNet: Revitalizing GPU as Packet Processing Accelerator", School of Electrical Engineering, KAIS, Feb. 26, 2017, 14 pages.
King-Smith, Tony, "Offload now, or your CPU dies!", aiMotive Team, https://medium.com/aimotive/offload-now-or-your-cpu-dies-ae1d9c5aec3c, Aug. 30, 2019, 14 pages.
Shainer, Gilad, "Offloading vs. Onloading: The Case of CPU Utilization", HPC Wire, https://www.hpcwire.com/2016/06/18/offloading-vs-onloading-case-cpu-utilization/, Jun. 18, 2016, 3 pages.
Tian, Kevin, "Intel® Scalable I/O Virtualization", LF Asia, LLC, Jun. 24, 2018, 21 pages.
Intel,"NFV Reference Design for a Containerized vEPC Application", ZTE, White Paper, © 2017 Intel Corporation, Jun. 20, 2017, 23 pp.
First Office Action for U.S. Appl. No. 17/134,361, dated Jun. 8, 2023, 12 pages.

\* cited by examiner

MEMORY ALLOCATION FOR DISTRIBUTED PROCESSING DEVICES

RELATED APPLICATION

The present application claims the benefit of a priority date of U.S. provisional patent application Ser. No. 63/022,193, filed May 8, 2020, the entire disclosure of which is incorporated herein by reference.

DESCRIPTION

Computing devices include hardware components such as processors, memory, and a communications interface. With ever increasing functionality and volumes of data, the speed of operation of hardware devices is also increasing. In some cases, the hardware devices can be coupled together using conductive leads on a circuit board to permit communications and device inter-operation. Other models of inter-operation can be used such as distributed computing whereby devices communication using a local network or the Internet and using packet-based communication.

DETAILED DESCRIPTION

In some examples, a system of devices can be implemented as tiles of different functional blocks that are interconnected and part of a Multi-Chip-Package (MCP). In some examples, a single chip with separate functional blocks can be formed (e.g., system on a chip (SoC)).

Figure 1:
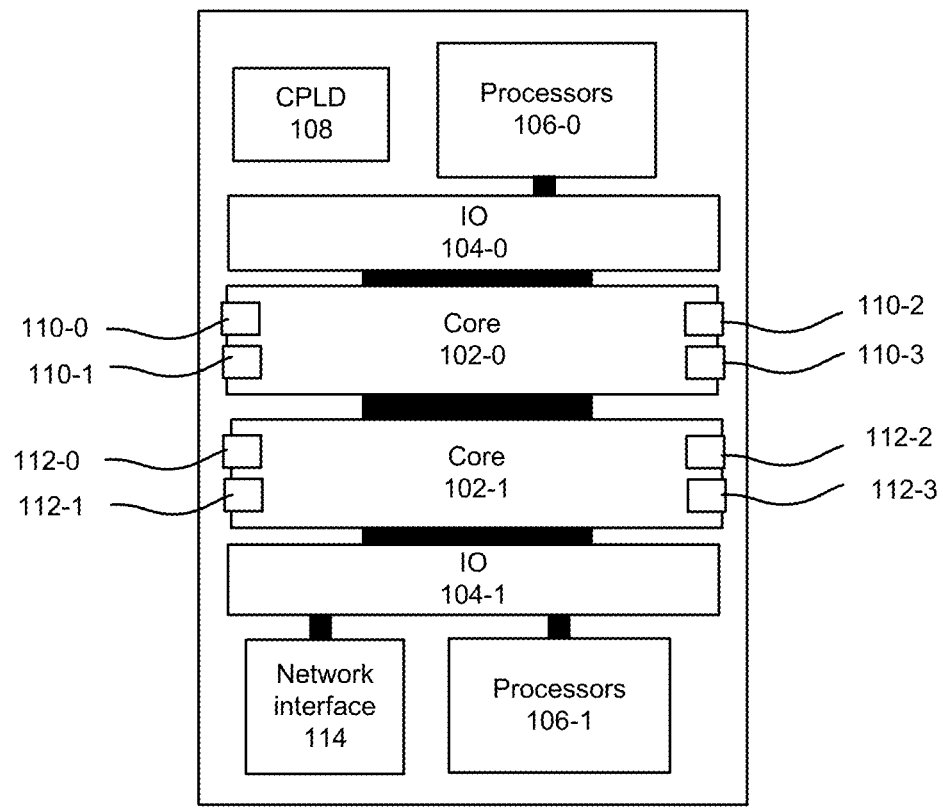
FIG. 1 depicts an example architecture.

FIG. 1 depicts an example CPU architecture. In this example, a physical package can include discrete dies and tiles connected by mesh or other connectivity as well as an interface (not shown) and heat dispersion (not shown). A die can include semiconductor devices that compose one or more processing devices or other circuitry. A tile can include semiconductor devices that compose one or more processing devices or other circuitry. For example, a physical CPU package can include one or more dies, plastic or ceramic housing for the dies, and conductive contacts that conductively coupled to a circuit board.

Core tile 102-0 and core tile 102-1 can include one or more cores. A core can be an execution core or computational engine that is capable of executing instructions. A core can access to its own cache and read only memory (ROM), or multiple cores can share a cache or ROM. Cores can be homogeneous (e.g., same processing capabilities) and/or heterogeneous devices (e.g., different processing capabilities). Frequency or power use of a core can be adjustable. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Cores may be coupled via an interconnect to a system agent (uncore). System agent can include a shared cache which may include any type of cache (e.g., level 1, level 2, or last level cache (LLC)). System agent can include or more of: a memory controller, a shared cache, a cache coherency manager, arithmetic logic units, floating point units, core or processor interconnects, or bus or link controllers. System agent or uncore can provide one or more of: direct memory access (DMA) engine connection, non-cached coherent master connection, data cache coherency between cores and arbitrates cache requests, or Advanced Microcontroller Bus Architecture (AMBA) capabilities. System agent or uncore can manage priorities and clock speeds for receive and transmit fabrics and memory controllers.

Core tiles 102-0 and 102-1 can be conductively connected together using a high speed interconnect compatible with any of Intel QuickPath Interconnect (QPI), Intel Ultra Path Interconnect (UPI), Intel On-Chip System Fabric (IOSF), Omnipath, Compute Express Link (CXL). The number of core tiles is not limited to this example can be any number such as 4, 8, and so forth. Core 102-0 can include various interfaces 110-0 to 110-3, although any number of interfaces can be used. For example, any interface 110-0 to 110-3 can be compatible with Peripheral Component Interconnect (PCIe), or other standards. Likewise, core 102-1 can include various interfaces 112-0 to 112-3, although any number of interfaces can be used. For example, any interface 112-0 to 112-3 can be compatible with Peripheral Component Interconnect (PCIe), or other standards.

Core tile 102-0 can be conductively connected with input output (IO) device 104-0 using a high speed interconnect compatible at least with any standard described herein. Likewise, core tile 102-1 can be conductively connected with input output (IO) device 104-1 using a high speed interconnect compatible at least with any standard described herein. IO device 104-0 can be formed on a separate integrated circuit or die as that of core tile 102-0 and/or processors 106-0. Likewise, IO device 104-1 can be formed on a separate integrated circuit or die as that of core 102-1 and/or processors 106-1.

Processors 106-0 and 106-1 can be available as offload engines for respective core 102-0 and core 102-1. Processors 106-0 and 106-1 can reside within a same CPU package as that which houses and provides connectivity to a circuit board for one or more of: IO 104-0, IO 104-1, core 102-0, core 102-1, and network interface 114. For example, processors 106-0 and 106-1 can include accelerators (e.g., fixed or programmable circuitry) for operations such as packet processing, cipher (e.g., encryption or decryption), access control list, applied machine learning (ML), or other operations. For example, processors 106-0 can receive packet traffic from a physical port of network interface 114 (e.g., Ethernet Controller) directly via IO 104-0. One or more ports of network interface 114 (e.g., virtual function (VF), mediated device and so forth) can be configured to copy data directly into a memory (e.g., by direct memory access (DMA)) of processors 106-1 via a software component (e.g., Control Plane Application (CPA) that executes in user space). When data from processors 106-1 is to be transmitted using network interface 114, processors 106-1 can copy data to host memory (not shown) and notify network interface 114 there is data to be transmitted.

Memory available for use by processors 106-1 can be limited and small compared to the size available in host memory. In some cases, network interface 114 or another device (e.g., core 102-1) can send data at un-deterministic rates (e.g., slow, fast, or bursty) to processors 106-1 and due to a limited size of memory buffers of processors 106-1, data may be copied into and out of memory buffers of processors 106-1 to host memory repeatedly or often and each data copy can introduce latency in the completion of an operation or availability of data as well as use of interface bandwidth for each data copy that can reduce interface bandwidth available for other uses or other devices. For example, egress traffic can be copied from processors 106-1 to host memory and then from host memory to network interface 114 due to limited buffer space available within processors 106-1.

Various embodiments provide for an offload engine (e.g., processors) to select available buffer space within the offload engine or host memory to attempt to reduce an amount of copy operations between host memory and the buffer. For example, to reduce latency or reduce utilized interface bandwidth, content can be copied from a processor buffer to host or system memory based on one or more of: buffer space is low on space, data is higher latency or lower priority, or available bandwidth through an interface between the buffer and the host memory.

Various embodiments can reduce latency of data availability or transmission and reduce usage of interface bandwidth by not copying all traffic to the host memory and storing some traffic in buffers. For example, for a data transmission operation, retaining data in buffers can reduce an amount of copy operations and data can be available to transmit sooner than if the data were copied to host memory and then copied to a network interface for transmission. As a traffic rate increases or scenarios arise where traffic is to be moved to host memory, placing the traffic in the host memory can still allow the processors to achieve target throughput rates of data processed.

Various embodiments provide processing operations prior to packet transmit or after packet receipt. For example, processing operations can include one or more of: packet processing, cipher, checksum calculation or validation, tunnel encapsulation or decapsulation, encryption or decryption, Transmission Control Protocol (TCP) offload, and so forth. Processors can perform packet processing for a virtualized network function (VNF) executed by a CPU. For example, the processors can receive packet and perform actions on it (e.g., decrypt the packet in line with a cryptography component) and send the processed packet to host memory for access by the VNF executed by the host. The processors can perform actions required by VNFs including 5G User Plane Function (UPF) or Next Generation Firewall (NGFW).

In some examples, a CPU can execute a driver for an offload processor and execute a driver for a network interface. When a network interface is enabled for use, a CPU-executed operating system (OS) can execute a driver to utilize and configure the network interface. When the CPU executes a driver for the offload processor, the OS recognizes the offload processor is available for access but does not interact with the network interface directly. In other words, in some examples, the OS may recognize the offload processor but not recognize or interact directly with the network interface. After the offload processor driver and network interface driver are initialized, the offload processor and network interface can communicate using an available interface or interfaces (e.g., PCIe). A network interface can be programmed to copy received traffic to the offload processor buffer (e.g., DMA) instead of to host memory for access by the OS.

In some examples, the offload processor can use DMA or remote direct memory access (RDMA) (or other direct copy operation) to copy content from an offload processor buffer to host memory within a same package or different package. In some examples, the offload processor can use DMA or remote direct memory access (RDMA) (or other direct copy operation) to copy content from an offload processor buffer to a network interface within a same package or different package. In some examples, the CPU can use DMA or remote direct memory access (RDMA) (or other direct copy operation) to copy content from memory to an offload processor buffer within a same package or different package. In some examples, the CPU can use DMA or remote direct memory access (RDMA) (or other direct copy operation) to copy content from memory to a network interface within a same package or different package. In some examples, the network interface can use DMA or remote direct memory access (RDMA) (or other direct copy operation) to copy content to an offload processor buffer within a same package or different package. In some examples, the network interface can use DMA or remote direct memory access (RDMA) (or other direct copy operation) to copy content to a memory within a same package or different package.

For example, a package include one or multiple dies, tiles, or chips (e.g., processor, CPU, network interface). A package can include one or more dies, tiles, or chips, plastic or ceramic housing for the dies, tiles, or chips and conductive contacts to connect to a motherboard or circuit board. Dies, chips or devices can be fabricated using different semiconductor process node sizes (e.g., 5 nm, 7 nm, 10 nm, and so forth). Dies, tiles, or chips can communicate using protocols such as Intel® Embedded Multi-die Interconnect Bridge (EMIB) or other protocol which can provide in-package interconnect of homogeneous dies, tiles, or chips (e.g., dies, tiles, or chips made of different process node sizes or different functionality) or heterogeneous dies, tiles, or chips (e.g., dies, tiles, or chips made of different process node sizes or different functionality).

Various embodiments can reduce east-west traffic (e.g., traffic within a data center) by providing one or more offload processors within a package.

Figure 2:
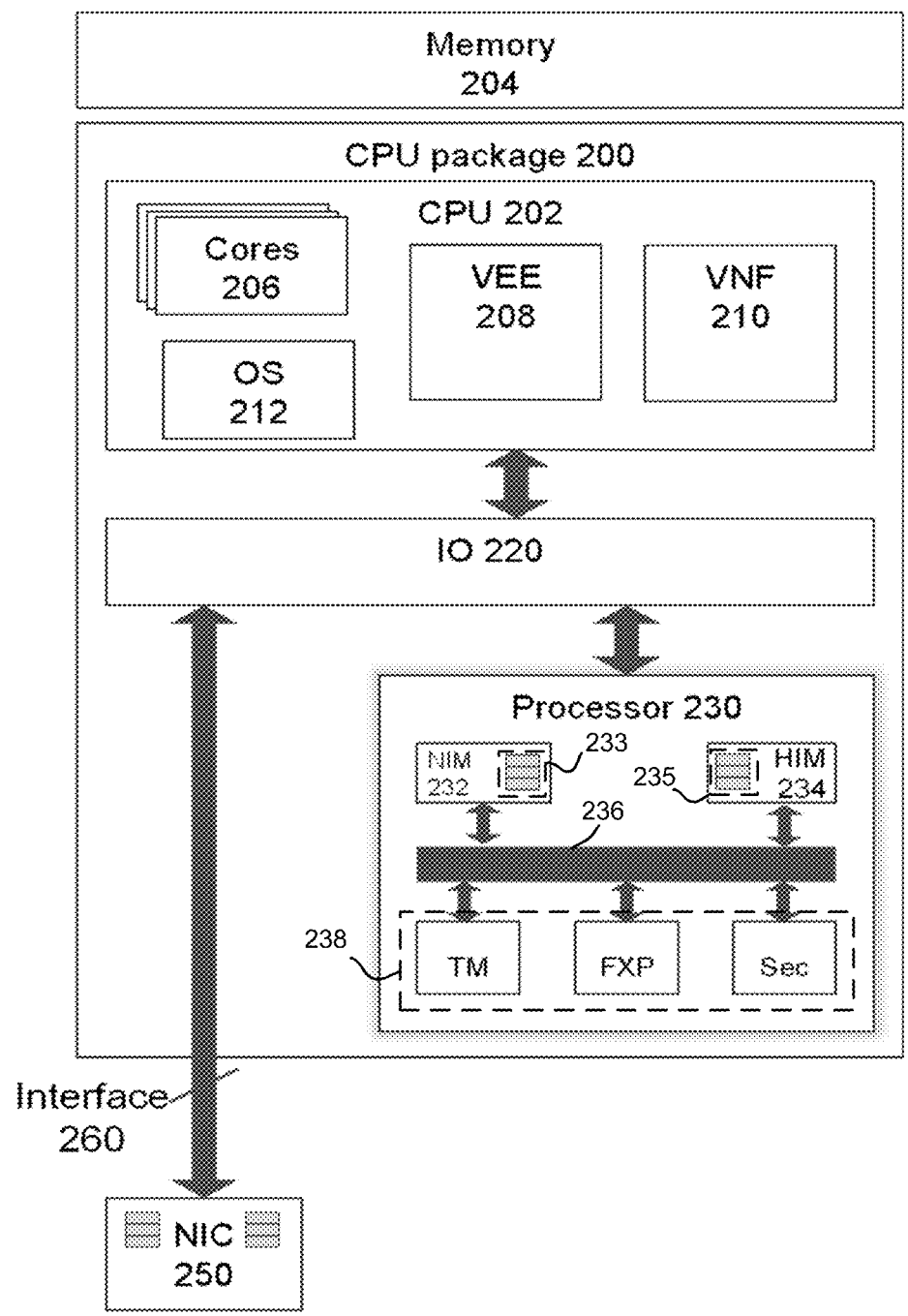
FIG. 2 depicts an example system.

FIG. 2 depicts an example system. CPU package 200 can use cores 206 and memory 204 to execute at least virtualized execution environments (VEEs) 208, VNF 210, an operating system 212, or applications (not shown). In some examples, cores 206 can include one or more of: a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. In some examples, an operating system (OS) 212 can be Linux®, Windows®, FreeBSD®, Android®, MacOS®, iOS®, or any other operating system. Memory 204 can be any type of volatile memory (e.g., DRAM), non-volatile memory, or persistent memory.

Virtualized execution environment 208 can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, the system of FIG. 2 can support single-root I/O virtualization (SR-IOV). SR-IOV is a specification that describes use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCIe configuration space but can share one or more physical resources on the network adapter, such as an external network port, with the PF and other PFs or other VFs.

Cores 206 can perform packet processing including one or more of: VNF 210, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

In some examples, VNF 210 can dynamically program processor 230 to process a flow for traffic based upon rules (e.g., drop packets of certain flows, decrypt on ingress, encrypt on egress). The system of FIG. 2 can use a network interface (NIC) 250 to transmit or receive packets using a network medium. A flow can be a sequence of packets being transferred between two endpoints, generally representing a single session using a known protocol. Accordingly, a flow can be identified by a set of defined N tuples and, for routing purpose, a flow can be identified by tuples that identify the endpoints, e.g., the source and destination addresses. For content based services (e.g., load balancer, firewall, intrusion detection system etc.), flows can be identified at a finer granularity by using five or more tuples (e.g., source address, destination address, IP protocol, transport layer source port, and destination port). A packet in a flow is expected to have the same set of tuples in the packet header. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Processor 230 can access Network Interface Manager (NIM) 232 (or packet storage controller) to manage sending traffic to NIC 250 and receiving traffic from NIC 250 via IO 220. In accordance with various embodiments described herein, NIM 232 can manage whether content is stored in a buffer 233 or host memory 204 based at least in part on one or more of: buffer space is low on space, data is higher latency or lower priority, or available bandwidth through an interface between the buffer and the host memory. NIM 232 can poll for and read descriptors indicating one or more packets have been received by network interface 250. NIM 232 can selectively modify receive or transmit descriptors based on storage location of respective data received by NIC 250 or content or data to be transmitted by NIC 250. For example, buffer 233 can be sufficiently large to store received data that is processed at, e.g., 500 Gbps, although other data receive rates can be supported. In some examples, buffer 233 can store descriptors and content or data for traffic received from NIC 250 or to be transmitted by NIC 250.

Host Interface Manager (HIM) 234 can present a SR-IOV interface for CPU 202 to access processor 230. Buffers 235 can be used to store data prior to processing or after processing. Buffers 235 can be implemented as SRAM memory in some examples. In some examples, buffer 233 and buffer 235 are the same buffer that can be accessed by any of HIM 234, NIM 232, or any offload processor. Various offload processors 238 can be available from processor 230 such as but not limited to fast traffic packet processor (FXP), a traffic Manager™ and a security component (Sec) for the encryption and decryption activities, or other accelerators or processors. A bus or other interconnect 236 can be used to communicatively couple offload processors with NIM 232 and HIM 234. In some examples, processor 230 can be implemented in a separate die than that of CPU 202.

Network interface 250 can provide communications with other network elements and endpoint devices. Any communications protocol can be used such as one or more of: Ethernet (IEEE 802.3), remote direct memory access (RDMA), InfiniBand, FibreChannel, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, fabric interface, and variations thereof. Data can be copied or stored to virtualized storage nodes using a protocol such as NVMe over Fabrics (NVMe-oF) or NVMe.

Figure 3:
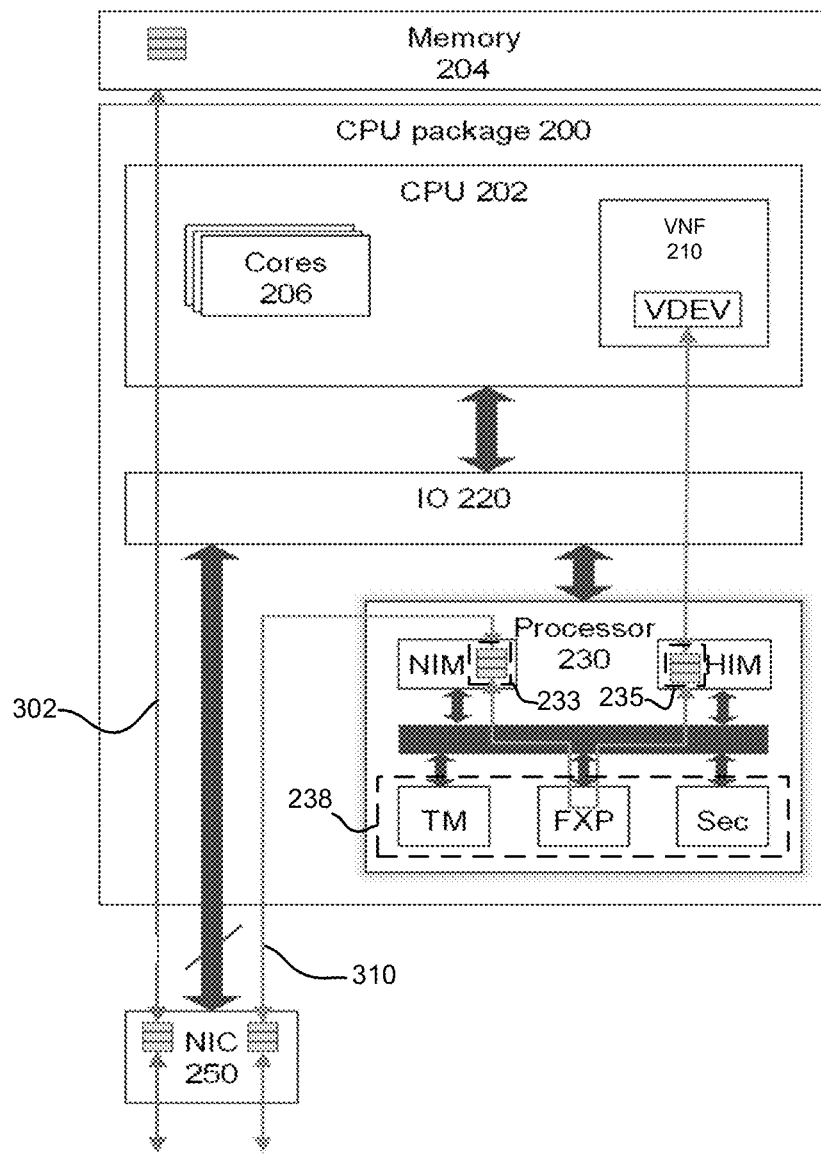
FIG. 3 depicts an example receive operation.

FIG. 3 depicts an example receive operation. In some examples, received packets can traverse a path 302 or path 310. According to path 302, for packets that are not to be processed by processor 230 (e.g., particular packet flows), NIC 250 copies received packets to system memory 204. For example, NIC 250 can perform a DMA or RDMA operation to copy the received packet (or portion thereof) to system memory 204. According to path 310, packets are to be processed by processor 230 (e.g., particular packet flows) and NIC 250 copies such received packets to buffer 233. For example, NIC 250 can perform a DMA or RDMA operation to copy the received packet (or portion thereof) to buffer 233. After one or more offload processors 238 performs the associated processing on portions of the received packets, processed packets are stored in buffer 235. For example, processor 230 can perform a DMA or RDMA operation to copy the processed content from buffer 235 to system memory 204.

Figure 4:
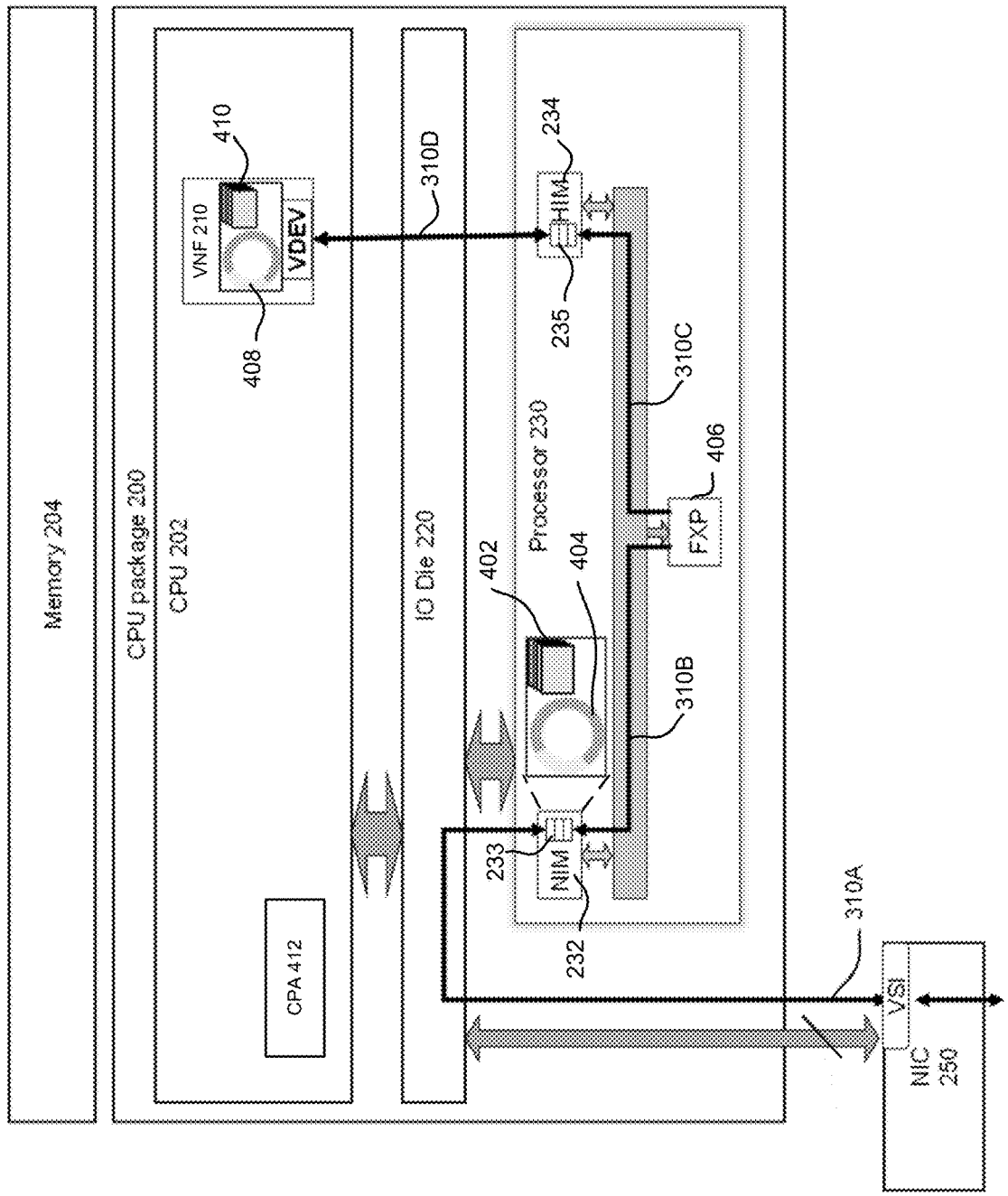
FIG. 4 depicts an example receive operation.

FIG. 4 depicts an example receive operation. In this example, the path 310 is depicted and use of fast packet processing (FXP) offload processor 406. Control plane application (CPA) 412 can configure and connect NIC 250 to one or more of IO die 220, CPU 202, and processor 230. NIC 250 can complete receive descriptors for received packets by providing a destination address in the descriptor as a location within buffer 233 of processor 230. At 310A, NIM 232 can receive a descriptor for inclusion in a descriptor ring 404 as well as data for storage in buffer 402. In some examples, NIM 232 can convert received descriptors to an internal format of the NIM. At 310B, processor 230 can copy or provide a pointer to FXP 406 to access data of the received packet or packets from buffer 233. In some examples, FXP 406 can access data from buffer 233 using a pointer, process the data and store the process data into buffer 233. In some examples, FXP 406 can copy the data to an intermediate buffer (not shown), process the data, and store the process data into the intermediate buffer. At 310C, processed data is made available to HIM 234 by copying the processed data to buffer 235 or providing a pointer to data in the intermediate buffer or buffer 233. Accordingly, in some examples, data that is processed can be transferred from buffer 233 to buffer 235.

Virtual Device (VDEV) can present an Ethernet device to VNF 210. At 310D, HIM 234 can copy processed data to buffer 410 (e.g., in memory 204) and an associated descriptor to a descriptor ring 408 (e.g., in memory 204). In some examples, NIM 232 can modify any associated descriptor to identify storage location of the processed packets in a buffer in memory 204 and provide the modified descriptors for access by CPU 202 (e.g., one or more cores). In this example, modified descriptors and data in buffer 402 in memory 204 are provided for access by VNF 210.

In some examples, if data is to be transmitted after processing received data, the data can be stored in buffer 233 and not copied to a buffer 410 of memory 204. For example, VNF 210 can initiate transmission of data by NIC 250 from buffer 233. Additional processing can occur prior to transmission such as encryption or packet header formation using offload processors of processor 230.

Figure 5:
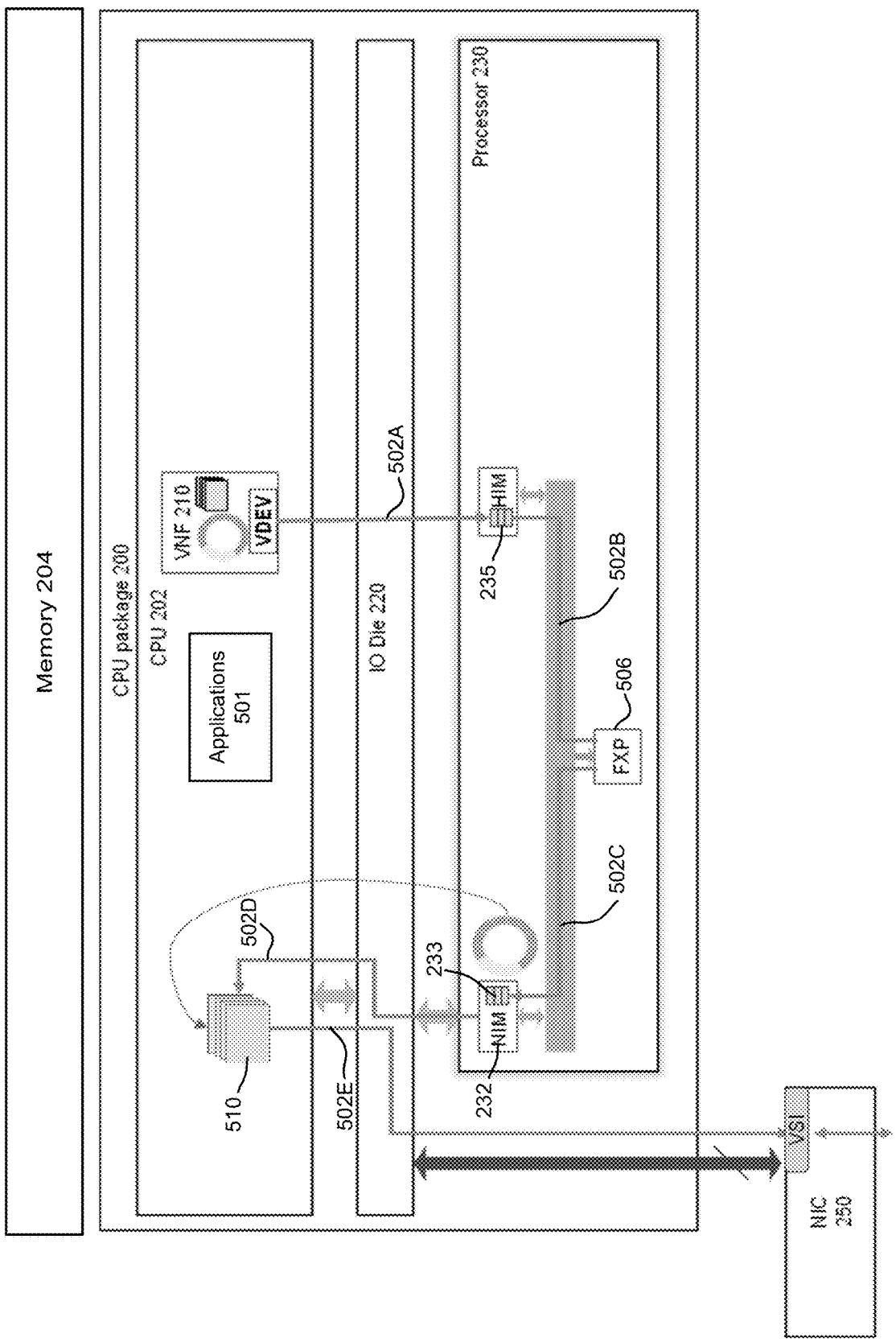
FIG. 5 depicts an example transmit operation.

FIG. 5 depicts an example transmit operation. In some examples, an application software 501 or VNF 210 can configure a priority of packet to be transmitted and provide a transmit descriptor to NIM 232. For example, an application or VNF 210 (or other software or hardware) can modify a packet descriptor to specify a priority level or latency of a packet to be transmitted. For example, a destination IP address or destination MAC address can correlate with a priority level, or virtual local area network (VLAN) tag can indicate a priority level. At 502A, CPU 202 (e.g., one or more cores) can cause data to be sent to processor 230 to buffer 235 by DMA or RDMA operation. CPU 202 can provide a descriptor for a packet to processor 230 and indicate where the data to be transmitted is stored (e.g., in buffer 235). At 502B, FXP 506 can access and process the data. FXP 506 can access data from buffer 235 using a pointer, process the data and store the processed data into buffer 235. In some examples, FXP 506 can copy the data to an intermediate buffer (not shown), process the data, and store the process data into the intermediate buffer.

At 502C, FXP 506 can indicate data is processed and available to transmit. Note that while the example is for use of FXP, any other offload processing or series of offload processing operations can take place such that the data may be available to transmit after a series of offload processing steps (e.g., packet processing, encryption, and so forth). FXP 506 can provide access to processed data by providing a pointer to a location in an intermediate buffer or buffer 235. In some examples, FXP 506 can copy the processed data to buffer 233. In some examples, buffer 233 and buffer 235 are the same buffer that can be accessed by any of HIM 234, NIM 232, or any offload processor. In some examples, the offload processor (e.g., FXP 406) provides metadata (e.g., packet size, packet priority) for use by NIM 232 to determine where to store the processed data.

In some examples, NIM 232 can determine whether to store processed packet data in buffer 233 or store the processed data in host memory 204 prior to transmission by NIC 250. For example, low latency or high priority packets can be stored in buffer 233 prior to transmission by NIC 250. For example, high latency or low priority packets can be stored in memory 204 prior to transmission by NIC 250. In some cases, if buffer 233 does not have enough space or its fullness level is beyond a threshold, processed data can be stored to memory 204 prior to transmission by NIC 250. Available bandwidth of an interface between processor 230 and memory 204 can also be taken into to determine whether to copy data to memory 204.

During low traffic throughput times, NIM 232 can decide to keep packets within buffer 233 for transmission. As the traffic rate increases, or if the available space in buffer 233 is limited, NIM 232 can begin placing packets for transmission in host memory 204 and updating the descriptors to indicate data is stored in memory 204.

A length of time that data is stored in buffer 233 can be unknown a priori because NIM 232 may not predict how long it will take NIC 250 to actually perform the transmit action and provide notification that said action has been finished. As such, how much buffer space is needed can be challenging to determine. Some NIC transmit times can be determined characterized and the buffer 233 size can be determined. However, different NIC vendors can have different transmit time characteristics. Accordingly, space in buffer 233 can be prioritized for use for imminent transmit operations or to preserve space in buffer 233.

At 502D, NIM 232 can update a transmit descriptor to indicate whether data is stored in a buffer 510 in memory 204 or buffer 233. For processed data to be stored in memory 204, processors 230 can copy (e.g., DMA or RDMA) processed data to memory 204 (e.g., reserved buffer by device driver for processors 230) and NIM 232 can revise the associated transmit descriptor with information, including the location in memory 204 where the packet data resides, and notify NIC 250 that there is data to be transmitted.

CPU 202 can initialize NIC 250 to fetch descriptors from buffer 233 by coordination between driver of processor 230 and driver of NIC 250. At 502E, NIC 250 can retrieve processed data based on descriptor content indicating location of data to be transmitted is stored in memory 204 or buffer 233. In some cases, where buffer 233 stores processed data, processors 230 can copy processed data to NIC 250 (e.g., by DMA or RDMA). In some cases, where memory 204 stores processed data, CPU 202 can copy (e.g., DMA or RDMA) processed data to NIC 250.

Copying data twice after processing by processors 230 can use interface bandwidth between memory 204 and processor 230 and slow ability to transmit data and can adversely affect performance. For example, two PCIe transactions can be used to push data to memory 204 and retrieve the data to NIC 250. By contrast, accessing processed data from buffer 233 may use merely one PCIe transaction to transfer data from memory 204 to buffer 233 and can reduce latency to transmit data.

Figure 6:
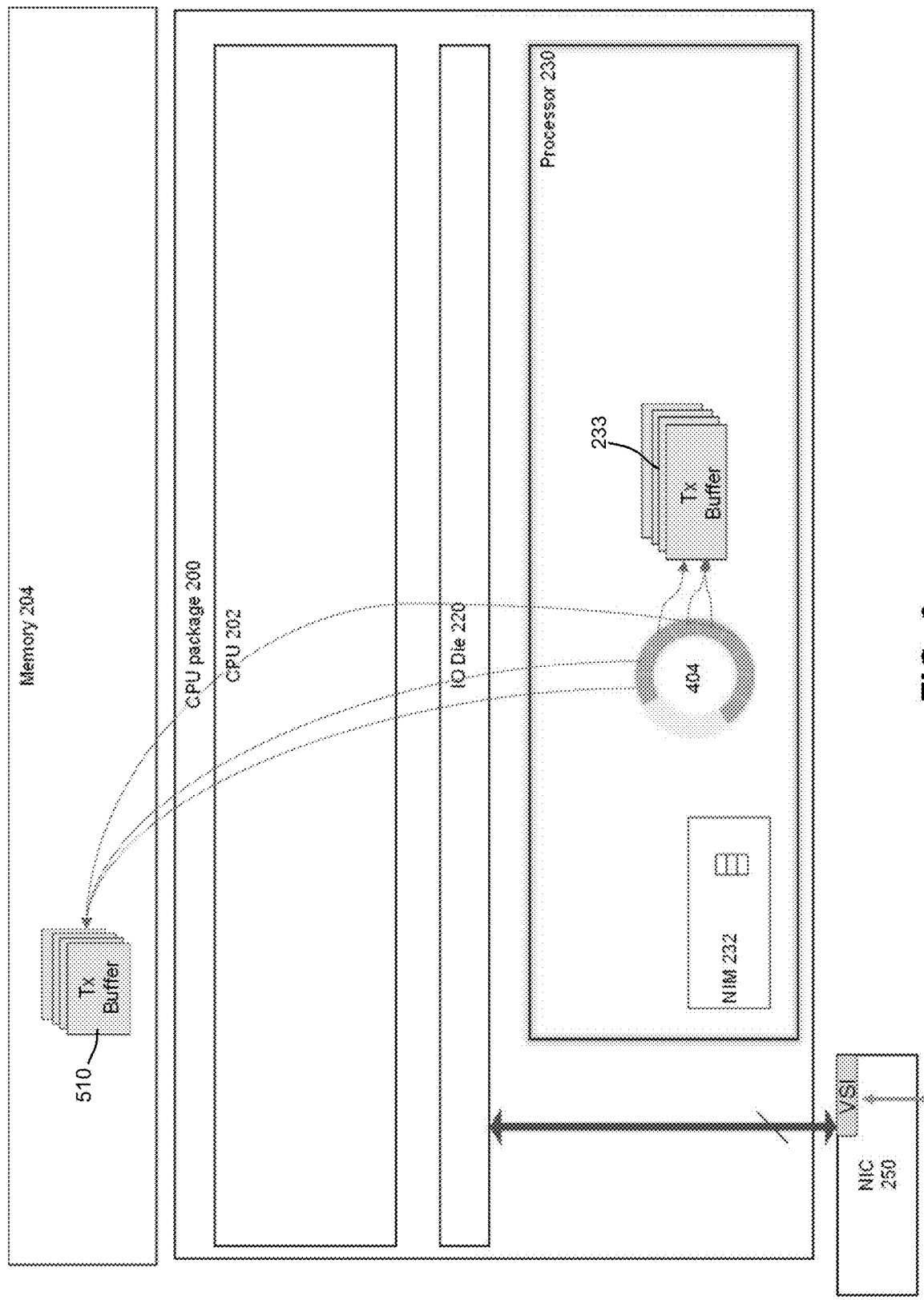
FIG. 6 depicts an example of use of descriptors in connection with a transmit operation.

FIG. 6 depicts an example of use of descriptors in connection with a transmit operation. In this example, descriptor ring 404 includes descriptors that refer to either buffer 233 used by processor 230 or buffer 510 in memory 204. NIC 250 can access descriptors from processors 230 to determine whether to retrieve or request availability of data from buffer 233 or buffer 510. Utilizing this hybrid model, at a high rate, even if only a small percentage of traffic are sent directly to NIC 250 from buffer 233 rather than an extra copy or DMA operation of data from memory 204 to NIC 250, a performance improvement can be achieved.

Examples provided herein are not limiting and processors 230 can be used as an intermediary device to process data or other content or generate data or other content received from any hardware device besides a network interface such as any hardware accelerator or remote network connected storage. For example, processors 230 can be an intermediate node among multiple processing nodes and NIM 232 can manage where data is stored after processing by processors 230.

Figure 7A:
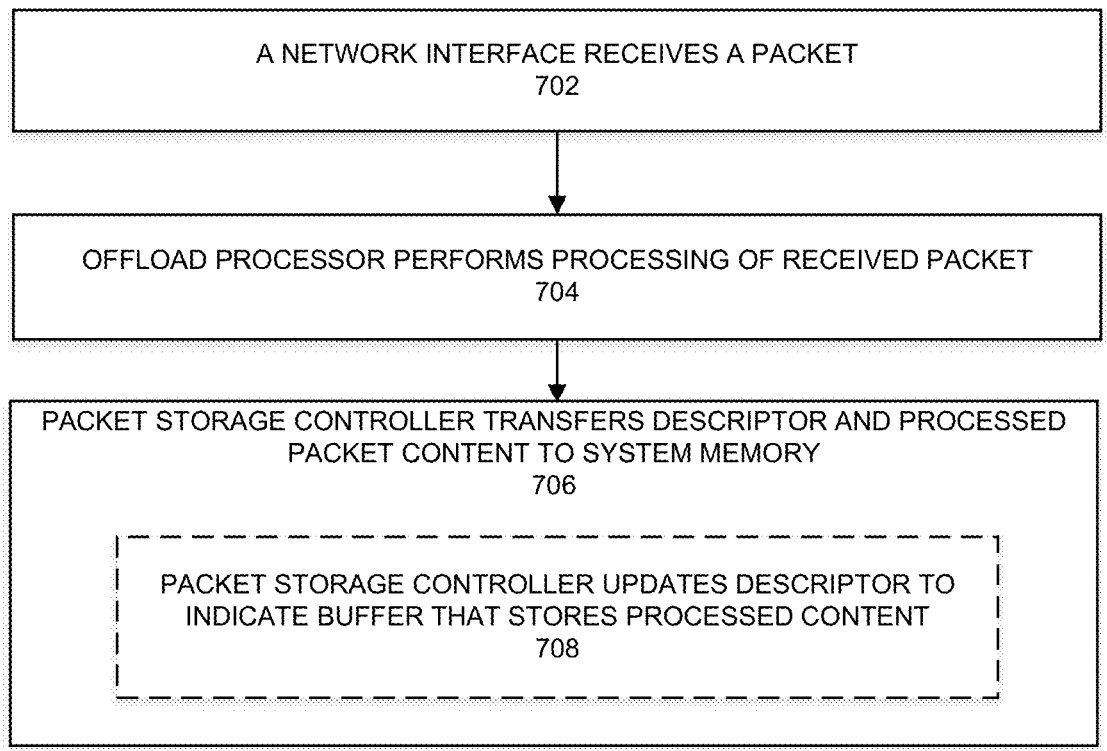
FIGS. 7A and 7B depict example processes.

FIG. 7A depicts an example process. This process can be used by various embodiments to by a storage controller in an offload processor to modify a descriptor to indicate where data is stored in host memory. At 702, a network interface can receive a packet and provide the packet to a buffer of an offload processor. For example, a host system can configure the network interface to store received packets in a buffer of the offload processor where the received packet is to be processed by the offload processor. The network interface can complete a descriptor for the received packet to identify a storage location of the packet in a buffer of the offload processor.

At 704, the offload processor can perform processing on the received packet. For example, offload processing to be performed on the received packet can be configured by an application or VNF or other software or device. For example, offload processing can include one or more of: packet header processing, checksum validation, decryption, access control list (ACL), firewall, and so forth.

At 706, the packet storage controller can transfer the descriptor for the processed packet and the processed packet contents to a buffer in system memory. In some cases, the packet storage controller includes a Network Interface Manager. At 708, the storage controller can update the descriptor to identify the storage location of the processed packet contents in a buffer system memory.

In some cases, such as where processed packet contents are to be transmitted after being received (e.g., as part of a service function chain (SFC)), packet storage controller can elect to store the processed content in the buffer and not store the processed content in system memory. A VNF or application can provide a hint that certain packet contents are to be transmitted and in 708, the packet storage controller can update a descriptor to indicate a storage location of the processed content is in a buffer of the offload processor and provide the descriptor to a CPU. When a VNF or other application requests packet transmission, the network interface can read a transmit descriptor that indicates the packet data is stored in an offload processor buffer and access the packet data from the offload processor buffer.

Figure 7B:
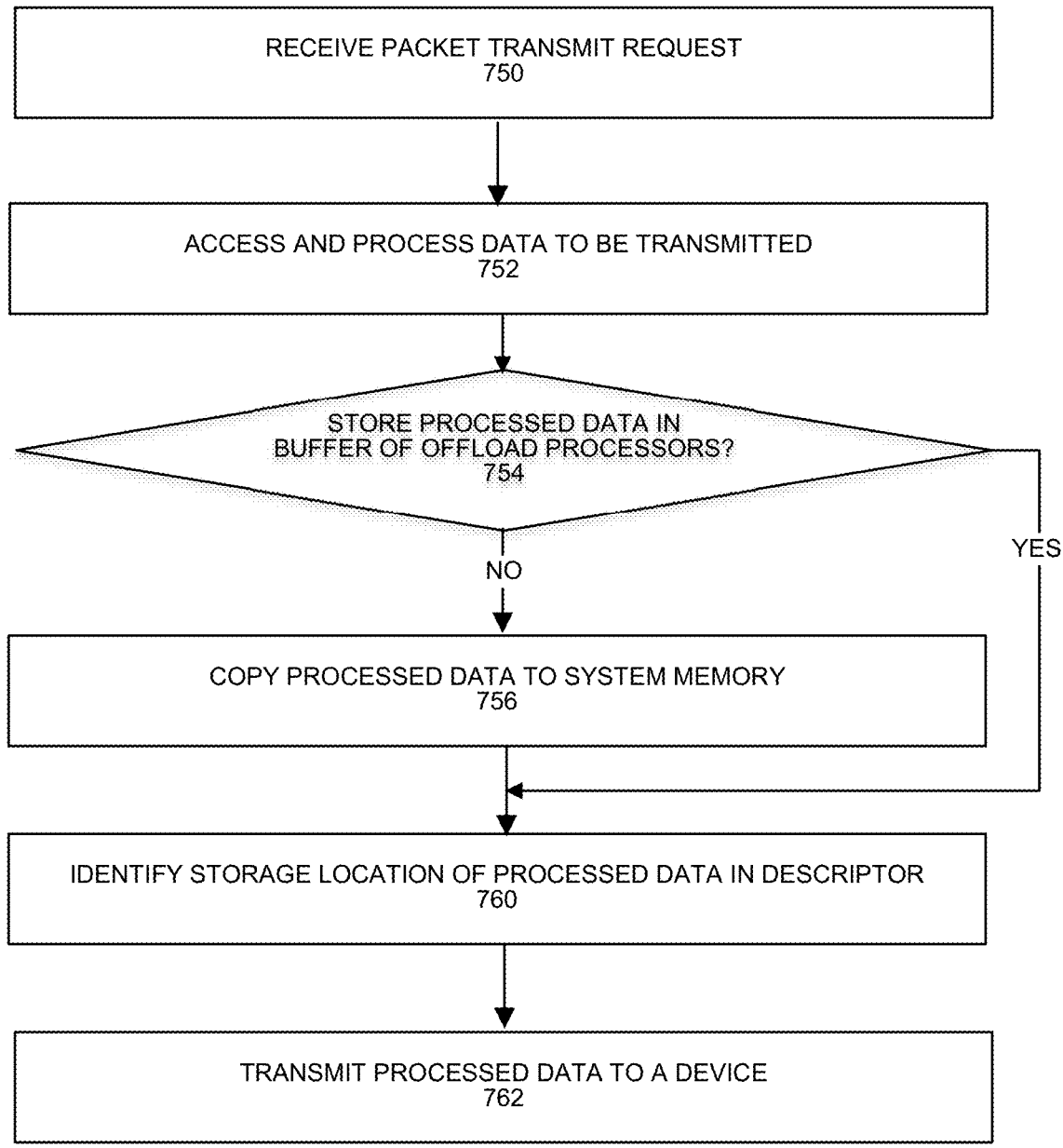

FIG. 7B depicts an example process. This process can be used by various embodiments to determine whether to store data to be transmitted in a buffer of an offload processor or a host memory. At 750, a packet transmit request is received at an offload processor. For example, a VNF or application can provide a descriptor for a packet and indicate where the data to be transmitted is stored in system memory. At 752, an offload processor can access and process data to be transmitted. For example, on the received data, offload processor can perform one or more of: packet processing (e.g., header parsing, flow identification, checksum validation, encryption, secure tunneling (e.g., Transport Layer Security (TLS) or Secure Sockets Layer (SSL)), or other operations.

At 754, after processing the data, a packet storage controller can determine whether to store processed packet data in a buffer of the offload processor or store the processed data in host memory prior to transmission. For example, low latency or high priority packets can be stored in a buffer of the offload processor whereas high latency or low priority packets can be stored in system memory. In some cases, if the buffer of the offload processor does not have enough space or its fullness level is beyond a threshold, processed data can be stored in system memory. Available bandwidth of an interface between offload processor and the system memory can also be taken into account to determine whether to copy data to system memory. If the packet storage controller determines to copy processed data to system memory, 756 can follow. If the packet storage controller determines to not copy processed data to system memory, 760 can follow.

At 756, data can be copied to system memory by the offload processor. At 760, the packet storage controller can update a transmit descriptor to indicate whether data is stored in a buffer of the offload processor or in system memory. At 762, the network interface can read a transmit descriptor from a descriptor ring of the packet storage controller and access the data for transmission.

Figure 8:
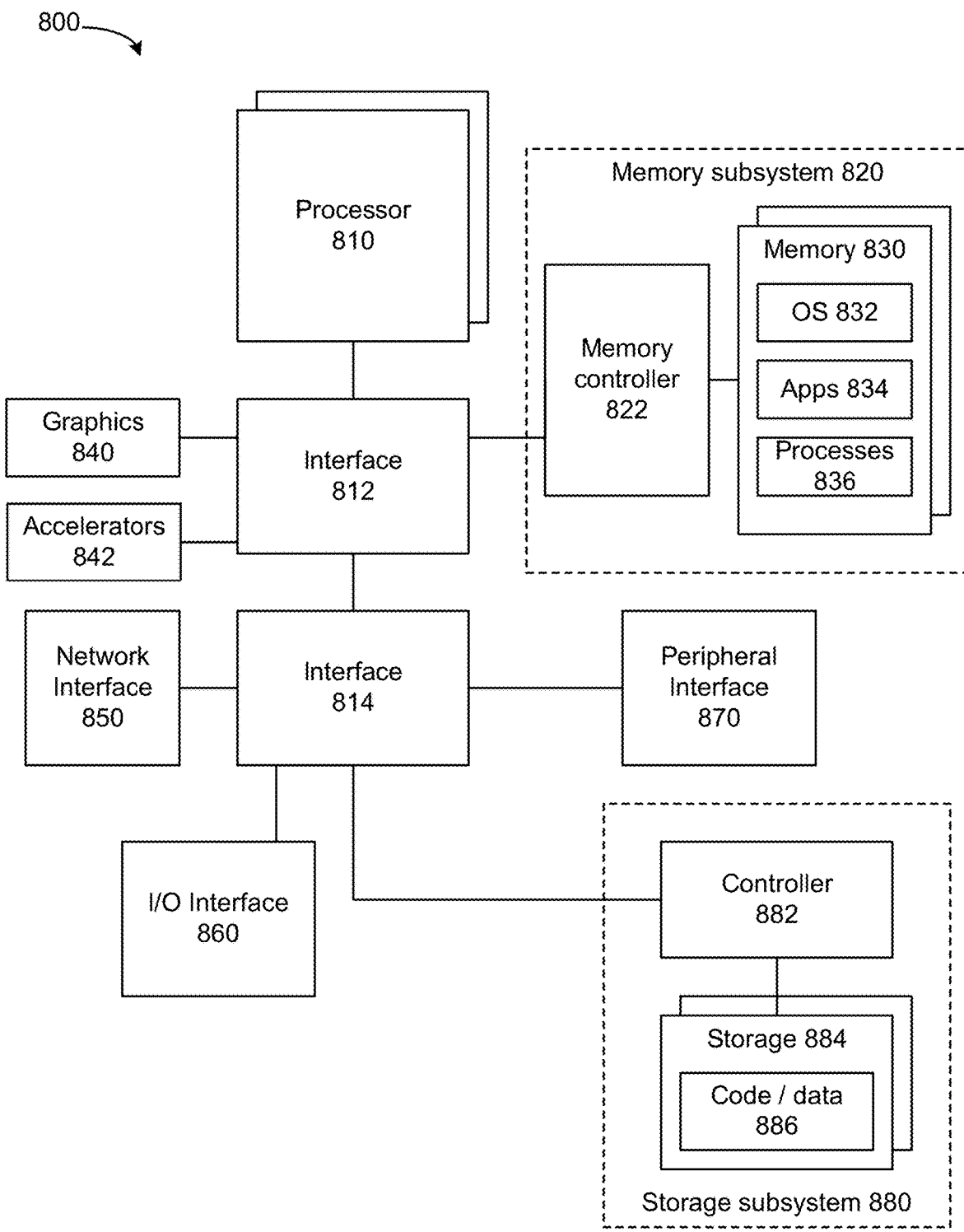
FIG. 8 depicts a system.

FIG. 8 depicts a system. The system can use embodiments described herein to determine where to store packet data after receipt by a network interface or prior to transmission by a network interface. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a programmable and/or fixed function offload engine that can be accessed or used by a processor 810 or network interface 850. For example, an accelerator can include one or more offload processors described herein. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. Various embodiments can be used in connection with network interface 850, processor 810, and memory subsystem 820.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 9:
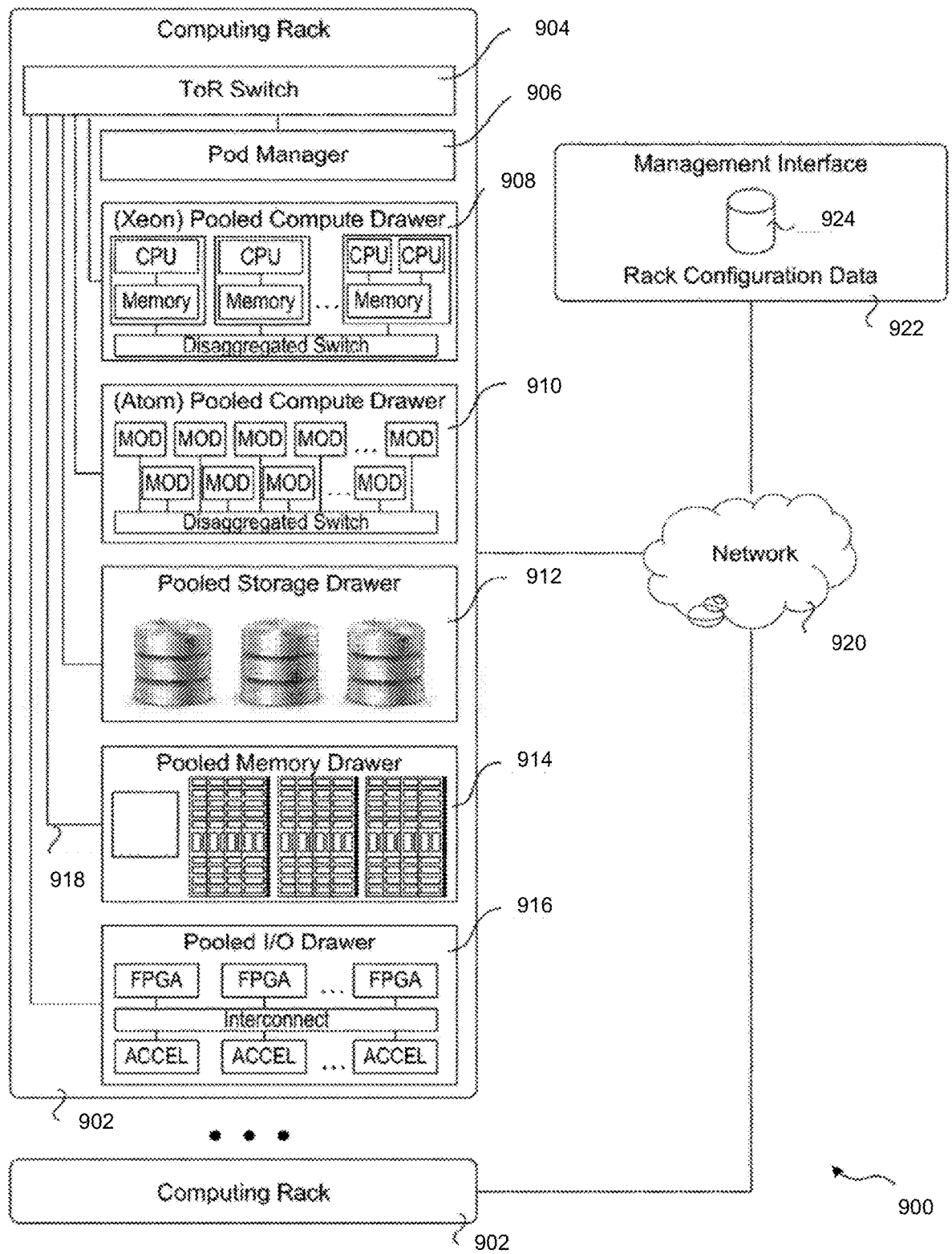
FIG. 9 depicts an example environment.

FIG. 9 depicts an environment 900 that includes multiple computing racks 902, each including a Top of Rack (ToR) switch 904, a pod manager 906, and a plurality of pooled system drawers. The environment can use embodiments described herein to determine where to store packet data after receipt by a network interface or prior to transmission by a network interface. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 908, and Intel® ATOM™ pooled compute drawer 910, a pooled storage drawer 912, a pooled memory drawer 914, and a pooled I/O drawer 916. Each of the pooled system drawers is connected to ToR switch 904 via a high-speed link 918, such as a 40 Gigabit/second (Gb/s) or 100 Gb/s Ethernet link or a 100+Gb/s Silicon Photonics (SiPh) optical link. In one embodiment high-speed link 918 comprises an 800 Gb/s SiPh optical link.

Multiple of the computing racks 902 may be interconnected via their ToR switches 904 (e.g., to a pod-level switch or data center switch), as illustrated by connections to a network 920. In some embodiments, groups of computing racks 902 are managed as separate pods via pod manager(s) 906. In one embodiment, a single pod manager is used to manage all of the racks in the pod. Alternatively, distributed pod managers may be used for pod management operations.

Environment 900 further includes a management interface 922 that is used to manage various aspects of the environment. This includes managing rack configuration, with corresponding parameters stored as rack configuration data 924.

Figure 10:
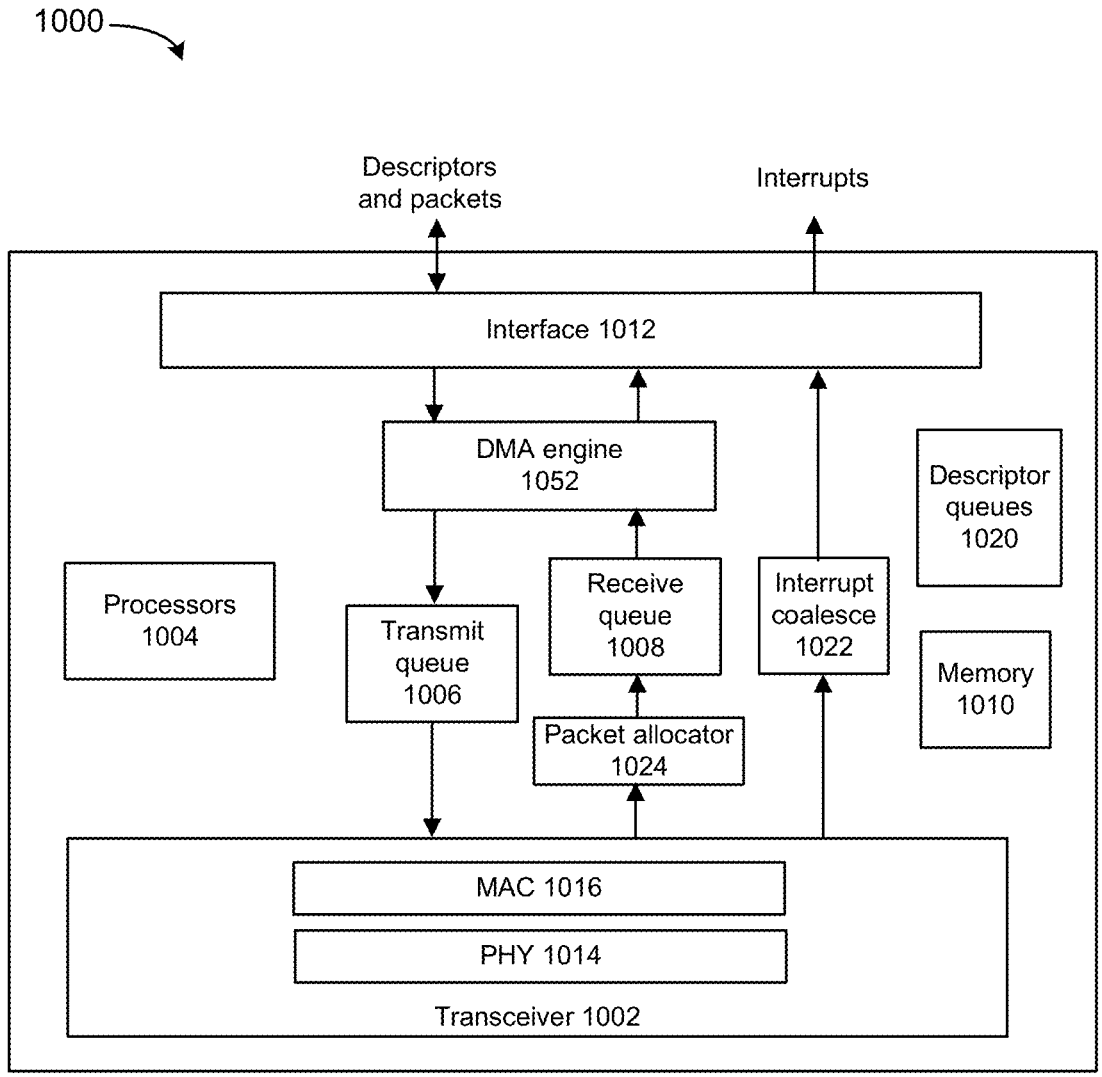
FIG. 10 depicts an example network interface.

FIG. 10 depicts a network interface that can use embodiments or be used by embodiments. Various embodiments described herein can be used to determine where to store packet data after receipt by a network interface or prior to transmission by a network interface. Network interface 1000 can include transceiver 1002, processors 1004, transmit queue 1006, receive queue 1008, memory 1010, and interface 1012, and DMA engine 1026. Transceiver 1002 can be capable of receiving and transmitting packets in conformance with the applicable protocols such as Ethernet as described in IEEE 802.3, although other protocols may be used. Transceiver 1002 can receive and transmit packets from and to a network via a network medium (not depicted). Transceiver 1002 can include physical layer (PHY) circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to assemble data to be transmitted into packets, that include destination and source addresses along with network control information and error detection hash values. MAC circuitry 1016 can be configured to process MAC headers of received packets by verifying data integrity, removing preambles and padding, and providing packet content for processing by higher layers.

Processors 1004 can be any a combination of a: processor, core, graphics processing unit (GPU), field programmable gate array (FPGA), application specific integrated circuit (ASIC), or other programmable hardware device that allow programming of network interface 1000. For example, processors 1004 can provide for allocation or deallocation of intermediate queues. For example, a "smart network interface" can provide packet processing capabilities in the network interface using processors 1004.

Packet allocator 1024 can provide distribution of received packets for processing by multiple CPUs or cores using timeslot allocation described herein or RSS. When packet allocator 1024 uses RSS, packet allocator 1024 can calculate a hash or make another determination based on contents of a received packet to determine which CPU or core is to process a packet.

Interrupt coalesce 1022 can perform interrupt moderation whereby network interface interrupt coalesce 1022 waits for multiple packets to arrive, or for a time-out to expire, before generating an interrupt to host system to process received packet(s). Receive Segment Coalescing (RSC) can be performed by network interface 1000 whereby portions of incoming packets are combined into segments of a packet. Network interface 1000 provides this coalesced packet to an application.

Direct memory access (DMA) engine 1026 can copy a packet header, packet payload, and/or descriptor directly from host memory to the network interface or vice versa, instead of copying the packet to an intermediate buffer at the host and then using another copy operation from the intermediate buffer to the destination buffer.

Memory 1010 can be any type of volatile or non-volatile memory device and can store any queue or instructions used to program network interface 1000. Transmit queue 1006 can include data or references to data for transmission by network interface. Receive queue 1008 can include data or references to data that was received by network interface from a network. Descriptor queues 1020 can include descriptors that reference data or packets in transmit queue 1006 or receive queue 1008. Host interface 1012 can provide an interface with host device (not depicted). For example, host interface 1012 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a computer-implemented method comprising: at an offload processing device within a central processing unit (CPU) package, determining whether to store data in a buffer of the offload processing device or a system memory external to the CPU package after processing by the offload processing device.

Example 2 includes any example, wherein determining whether to store data in a buffer of the offload processing device or a system memory is based on one or more of: available buffer space, latency limit associated with the data, priority associated with the data, or available bandwidth through an interface between the buffer and the system memory.

Example 3 includes any example, and includes: receiving a descriptor, wherein the descriptor is associated with a packet to be transmitted and at the offload processing device, specifying a storage location of data in the descriptor, wherein the storage location is to refer to a location in the buffer or the system memory.

Example 4 includes any example, and includes receiving a descriptor from a network interface, wherein the descriptor is associated with a received packet and at the offload processing device, specifying a storage location of data in the descriptor, wherein the storage location is to refer to a location in the buffer or the system memory.

Example 5 includes any example, wherein the buffer provides a fixed storage amount and the system memory provides an expandable storage amount.

Example 6 includes any example, and includes based on a determination to store data in the system memory, copying the data the system memory using an interface compatible with Peripheral Component Interconnect (PCIe).

Example 7 includes any example, wherein a rate of data receipt at the offload processing device is indeterministic and comprises one or more of slow, fast, or bursty receive rates.

Example 8 includes any example, and includes the offload processing device performing processing on the data, the processing comprising one or more of: packet processing, encryption, decryption, or secure tunneling.

Example 9 includes any example, and includes the offload processing device providing an interface between a network interface and a CPU.

Example 10 includes any example, and includes an apparatus that includes an offload processor within a central processing unit (CPU) package, the offload processor to receive data for transmission using a network interface or received in a packet by a network interface, wherein the offload processor comprises a packet storage controller to determine whether to store data in a buffer of the offload processor or a system memory after processing by the offload processor.

Example 11 includes any example, wherein determine whether to store data in a buffer of the offload processor or a system memory is based on one or more of: available buffer space, latency limit associated with the data, priority associated with the data, or available bandwidth through an interface between the buffer and the system memory.

Example 12 includes any example, wherein the offload processor is to receive a descriptor, wherein the descriptor is associated with a packet to be transmitted and at the offload processor, specify a storage location of data in the descriptor, wherein the storage location is to refer to a location in the buffer or the system memory.

Example 13 includes any example, wherein the offload processor is to receive a descriptor from a network interface, wherein the descriptor is associated with a received packet and at the offload processor, specify a storage location of data in the descriptor, wherein the storage location is to refer to a location in the buffer or the system memory.

Example 14 includes any example, wherein the buffer provides a fixed storage amount and the system memory provides an expandable storage amount.

Example 15 includes any example, wherein: based on a determination to store data in the system memory, the offload processor is to copy the data to the system memory using an interface compatible with Peripheral Component Interconnect (PCIe).

Example 16 includes any example, wherein a rate of data receipt at the offload processor is indeterministic and comprises one or more of slow, fast, or bursty receive rates.

Example 17 includes any example, wherein the offload processor is to process the data, wherein the process the data comprises one or more of: packet processing, encryption, decryption, or secure tunneling.

Example 18 includes any example, wherein the offload processor is to provide an interface between a network interface and a CPU.

Example 19 includes any example, and includes a network interface communicatively coupled to the offload processor and a CPU communicatively coupled to the offload processor, wherein the offload processor and the CPU share a package.

Example 20 includes any example, wherein a server computing platform comprises the offload processor.

What is claimed is:

1. A computer-implemented method comprising:
   at an offload processing device within a central processing unit (CPU) package;
   the offload processing device processing data,
   determining whether to store the processed data in a buffer of the offload processing device or a system memory external to the CPU package, and
   storing the data based on the determination, wherein:
   the offload processing device comprises an accelerator device,
   the offload processing device is positioned within the CPU package,
   a core offloads to the offload processing device the determining whether to store data in the buffer of the offload processing device or the system memory external to the CPU package, and
   for a packet to be transmitted by a network interface device:
   the packet to be transmitted comprises the data processed by the offload processing device and
   the determining whether to store the data in the buffer of the offload processing device or the system memory external to the CPU package is based on priority of the packet, packet transmit time, and load on the network interface device and
   for a packet received by the network interface device:
   the data processed by the offload processing device comprises a portion of the received packet and
   the determining whether to store data in the buffer of the offload processing device or the system memory external to the CPU package is based on whether the data is to be transmitted after processing by the offload processing device.

2. The method of claim 1, wherein determining whether to store data in a buffer of the offload processing device or a system memory is also based on one or more of: available buffer space, latency limit associated with the data, priority associated with the data, or available bandwidth through an interface between the buffer and the system memory.

3. The method of claim 1, comprising:
   receiving a descriptor, wherein the descriptor is associated with the packet to be transmitted and
   at the offload processing device, specifying a storage location of the data in the descriptor, wherein the storage location is to refer to a location in the buffer or the system memory and the storage location of the data is based on the determination to store the processed data in the buffer of the offload processing device or the system memory external to the CPU package.

4. The method of claim 1, comprising:
   receiving a descriptor from the network interface device, wherein the descriptor is associated with the received packet and
   at the offload processing device, specifying a storage location of the data in the descriptor, wherein the storage location is to refer to a location in the buffer or the system memory.

5. The method of claim 1, wherein the buffer provides a fixed storage amount and the system memory provides an expandable amount of storage.

6. The method of claim 1, comprising:
   based on a determination to store data in the system memory, copying the data the system memory using an interface compatible with Peripheral Component Interconnect (PCIe).

7. The method of claim 1, wherein a rate of data receipt at the offload processing device is indeterministic and comprises one or more of slow, fast, or bursty receive rates.

8. The method of claim 1, wherein
   the processing data comprises one or more of: packet processing, encryption, decryption, or secure tunneling.

9. The method of claim 1, comprising:
   the offload processing device providing an interface between the network interface device and a CPU.

10. An apparatus comprising:
    a multi-tile central processing unit (CPU) package comprising multiple tiles, a first interface, and a second interface, wherein:
    the first interface is to provide communication among at least two of the multiple tiles the second interface is to provide communication among at least one of the multiple tiles and a network interface, at least one of the multiple tiles comprises at least one processor core, at least one of the multiple tiles comprises an offload processor and a buffer, the offload processor is to process data to be transmitted in a packet using the network interface and process second data received in a packet by the network interface, and the offload processor comprises circuitry to determine whether to store the processed data in the buffer of the at least one of the multiple tiles that comprises the offload processor and the buffer or a system memory after processing by the offload processor and determine whether to store the processed second data in the buffer of the at least one of the multiple tiles that comprises the offload processor and the buffer or the system memory after processing by the offload processor.

11. The apparatus of claim 10, wherein the determine whether to store the processed data in the buffer of the offload processor or the system memory is based on one or more of: available buffer space, latency limit associated with the processed data, priority associated with the processed data, or available bandwidth through an interface between the buffer and the system memory and wherein the determine whether to store the processed second data in the buffer of the at least one of the multiple tiles that comprises the offload processor and the buffer or the system memory after processing by the offload processor is based on one or more of: available buffer space, latency limit associated with the processed second data, priority associated with the processed second data, or available bandwidth through an interface between the buffer and the system memory.

12. The apparatus of claim 10, wherein the offload processor is to receive a descriptor, wherein the descriptor is associated with the packet to be transmitted and the offload processor is to specify a storage location of the processed data in the descriptor, wherein the storage location is to refer to a location in the buffer or the system memory.

13. The apparatus of claim 10, wherein the offload processor is to receive a descriptor from the network interface, wherein the descriptor is associated with the received packet and the offload processor is to specify a storage location of the processed second data in the descriptor, wherein the storage location is to refer to a location in the buffer or the system memory.

14. The apparatus of claim 10, wherein the buffer provides a fixed storage amount and the system memory provides an expandable amount of storage.

15. The apparatus of claim 10, wherein:

based on a determination to store the processed data in the system memory, the offload processor is to copy the processed data to the system memory using an interface compatible with Peripheral Component Interconnect (PCIe).

16. The apparatus of claim 10, wherein a rate of data receipt at the offload processor is indeterministic and comprises one or more of slow, fast, or bursty receive rates.

17. The apparatus of claim 10, wherein the process the data comprises one or more of: packet processing, encryption, decryption, or secure tunneling and wherein the process the second data comprises one or more of: packet processing, encryption, decryption, or secure tunneling.

18. The apparatus of claim 10, wherein the offload processor is to provide an interface between the network interface and a CPU.

19. The apparatus of claim 10, comprising the network interface.

20. The apparatus of claim 10, comprising a server computing platform, wherein the server computing platform comprises the multi-tile central processing unit (CPU) package.

\* \* \* \* \*

UNITED STATES PATENT AND TRADEMARK OFFICE
CERTIFICATE OF CORRECTION

PATENT NO. : 11,934,330 B2
APPLICATION NO. : 15/931476
DATED : March 19, 2024
INVENTOR(S) : Patrick G. Kutch and Andrey Chilikin Page 1 of 1

It is certified that error appears in the above-identified patent and that said Letters Patent is hereby corrected as shown below:

In the Claims

Column 19, Lines 53-54, Claim 1:
"at an offload processing device within a central processing unit (CPU) package;"
Should read:
at an offload processing device within a central processing unit (CPU) package:

Column 20, Lines 66-67, Claim 10:
"the first interface is to provide communication among at least two of the multiple tiles"
Should read:
the first interface is to provide communication among at least two of the multiple tiles, Signed and Sealed this
Seventh Day of May, 2024

Katherine Kelly Vidal
*Director of the United States Patent and Trademark Office*